May 30, 1967
H. R. ROTTMANN
3,322,023
DETECTION OF CHIPS IN SYRINGE CARTRIDGES
Filed Jan. 26, 1962
4 Sheets-Sheet 1
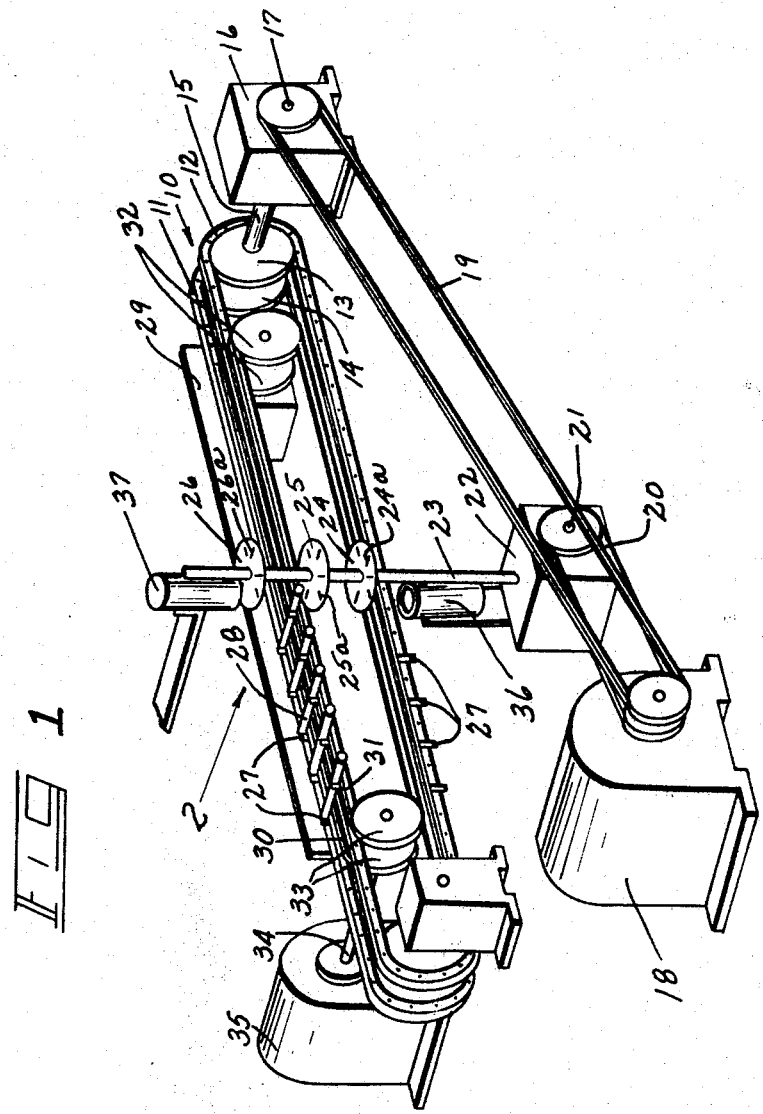
INVENTOR.
Hans R. Rottmann
BY W. A. Schaich +
D. F. Janis
ATTORNEYS May 30, 1967 H. R. ROTTMANN 3,322,023
DETECTION OF CHIPS IN SYRINGE CARTRIDGES
Filed Jan. 26, 1962 4 Sheets-Sheet 2
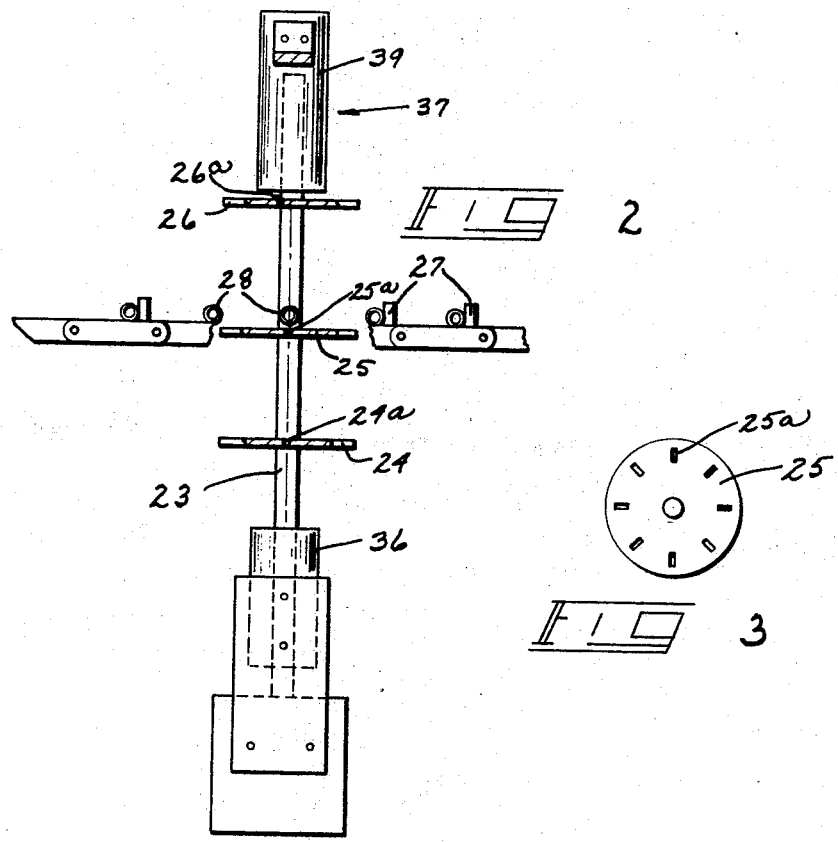
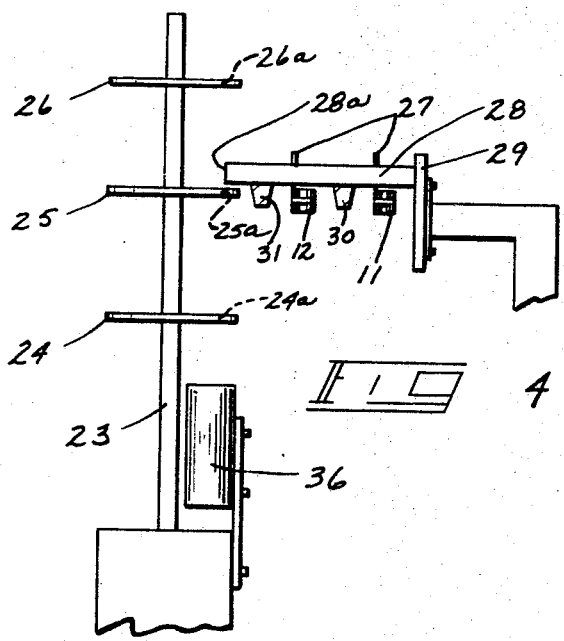
INVENTOR.
Hans R. Rottmann
BY W. A. Schaich &
D. T. Innis
ATTORNEYS

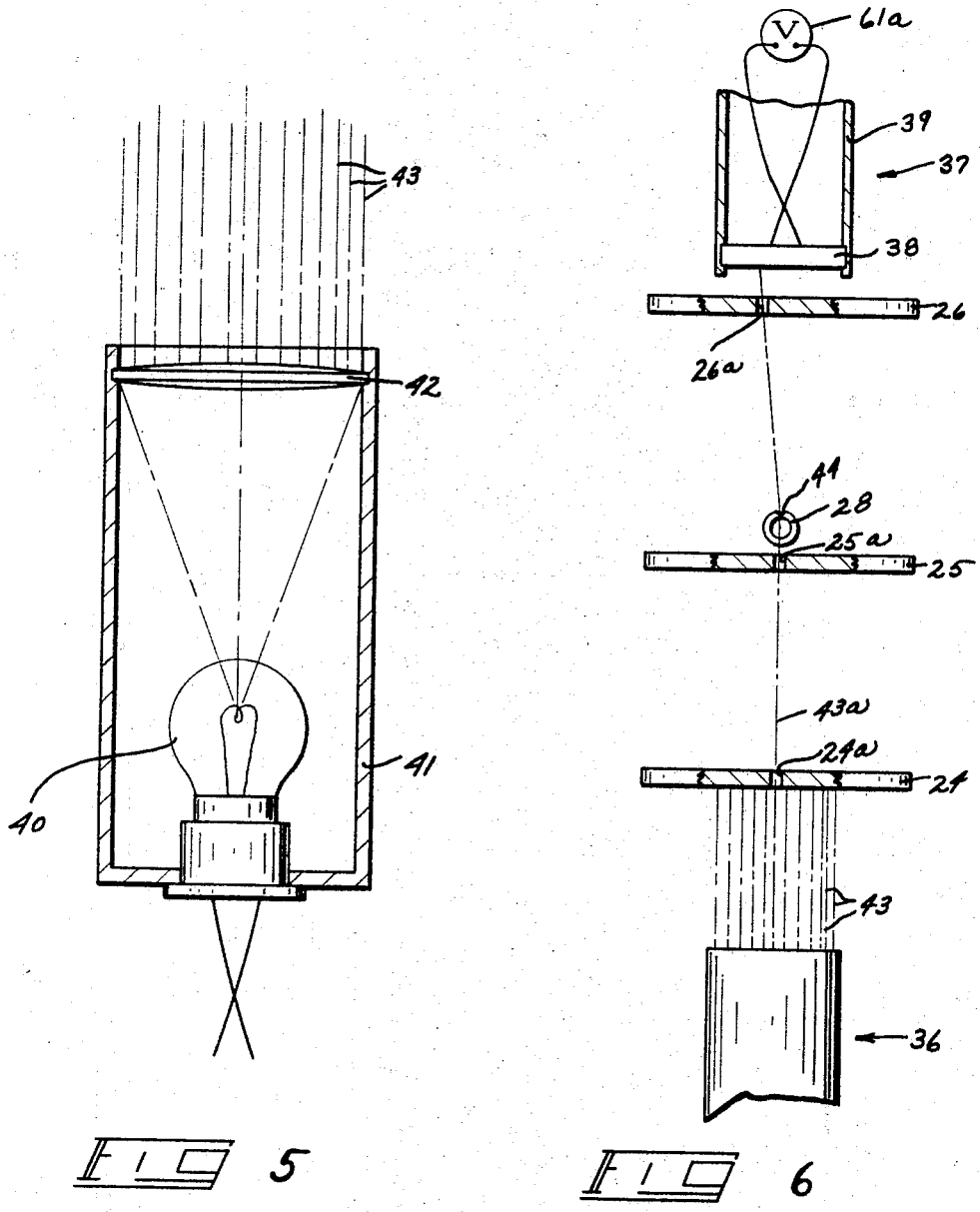

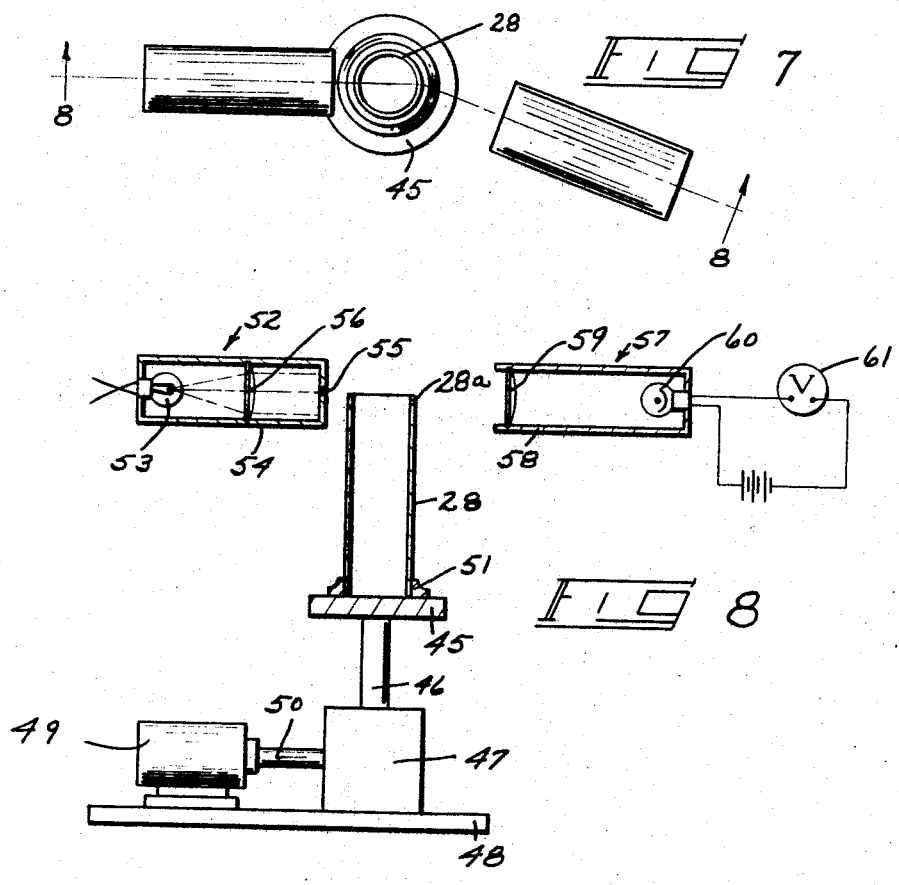

United States Patent Office 3,322,023
Patented May 30, 1967

3,322,023
DETECTION OF CHIPS IN SYRINGE
CARTRIDGES
Hans R. Rottmann, Toledo, Ohio, assignor to Owens-Illinois, Inc., a corporation of Ohio
Filed Jan. 26, 1962, Ser. No. 168,989
1 Claim. (Cl. 88—14)

This invention relates to a method and apparatus for inspecting syringe cartridges to determine the presence or absence of chips in the ends of said cartridges. More particularly, this invention relates to a method and apparatus for inspecting a plurality of cartridges in succession at relatively high rates of speed utilizing the principle of refraction of light passing through the chipped cartridge.

In the manufacture of small syringe cartridges it has been extremely difficult to inspect the cartridges at the speeds with which the cartridges are formed without utilizing the services of several inspectors. The most prevalent and hardest to detect fault is the presence of small chips in the ends of the cartridges.

With this in mind it is an object of this invention to provide apparatus for inspecting syringe cartridges at high speeds without requiring the services of an inspector.

It is a further object of this invention to provide a method of detecting chips in syringe cartridges during translatory movement of the cartridges through an optical inspection zone.

It is a further object of this invention to provide a method and apparatus for detecting chips in tubular glass members while they are being conveyed in a continuous manner and which permits scanning the entire circumferential edge of the members by use of optical means.

Other and further objects will become apparent from the following disclosure taken in connection with the accompanying drawings wherein:

FIG. 1 is a perspective view of the inspecting and conveying apparatus of the invention.

FIG. 2 is an elevational view of the inspection station partly in section, taken in the direction of arrow 2 on FIG. 1.

FIG. 3 is a plan view of one of the apertured discs.

FIG. 4 is a side elevational view of a portion of the inspection station illustrated in FIG. 2.

FIG. 5 is a cross-sectional view on an enlarged scale of the light source or source of radiation utilized in the invention.

FIG. 6 is a schematic elevational view illustrating the optical system of the invention and the relationship of the disc apertures or slits with respect to the light source and photo-sensitive pick-up.

FIG. 7 is a schematic top plan view of the second embodiment of the invention.

FIG. 8 is an elevational view in cross-section taken at line 8—8 on FIG. 7.

FIG. 9 is a plan view of a portion of a cartridge illustrating the passage of a beam undeflected through the cartridge, and FIG. 10 is a view similar to FIG. 9 illustrating the deflection beam due to the presence of a chip in the edge of the cartridge.

Referring now to FIG. 1 the general organization of the apparatus of the invention is shown. In general the apparatus of the invention comprises a horizontal conveyor generally designated 10 which is comprised of two chain members 11 and 12 which are driven toward the right as viewed in FIG. 1. These chain members are endless and pass over supporting sprocket wheels 13 and 14 which sprocket wheels are mounted on and fixed to a shaft 15. The shaft 15 is the output shaft from a gear box 16 which in turn has its input shaft 17 driven by a motor 18 and drive belt 19. The motor 18 also drives a second belt 20 which rotates an input shaft 21 of a second gear box 22. The gear box 22 has an output shaft 23 to which are mounted three horizontally disposed discs 24, 25 and 26. The discs 24, 25 and 26 are fixed to the shaft 23 and will be rotated thereby in synchronism with the speed of movement of the conveyor 10. Each of the discs has a plurality of circumferentially spaced radially extending slits 24a, 25a and 26a formed therethrough with each disc having the same number of slits.

The chain members 11 and 12 have a plurality of vertically extending lugs 27 formed thereon, only a few of which are shown in FIG. 1, it sufficing to say that there are a plurality of these lugs 27 equally spaced along the total length of both chain members 11 and 12. The syringe cartridges or tubular glass elements of preselected length are loaded onto the chain members 11 and 12 at the left hand end as viewed in FIG. 1. The lugs 27 will engage the sidewall of the cartridges 28 and move them from left to right in predetermined spaced intervals determined by the spacing of the lugs. The cartridges 28, during their movement from left to right, will have their rearwardly extending ends in contact with a positioning plate 29 which extends parallel to the conveyor 10.

While the plate 29 is shown in FIGS. 1 and 4 as being at the back of the conveyor, alternatively, it could extend along the front edge of the conveyor to maintain the cartridges in their proper position at the inspection station.

Between members 11 and 12, and extending in parallel relationship thereto, is an endless belt 30. A second endless belt 31 is coextensive with and parallel with the belt 30 but is positioned on the outside of chain member 12. The belts 30 and 31 are supported by pulleys 32 at one end and are driven by a pair of pulleys 33 which are fixed to a shaft 34 of a motor 35. The motor drives the pulleys 33 in a counterclockwise direction so as to drive the belts 30 and 31 toward the left as viewed in FIG. 1.

As can be seen when viewing FIG. 4, the belts 30 and 31 have their upper surfaces slightly above the plane defined by the upper surfaces of the chain members 11 and 12. Furthermore, as pointed out above, the belts 30 and 31 are driven in a direction opposite to that of the direction of movement of the members 11 and 12. In this manner as the cartridges are moved by the lugs on the members 11 and 12 toward the right as viewed in FIG. 1, the belts 30 and 31 rotate the cartridges about their horizontal, longitudinal axes through the frictional engagement of the upper surfaces of the belts with the cartridges resting thereon. In this manner the cartridges are rotated while at the same time they are being conveyed toward the right as viewed in FIG. 1. The belts 30 and 31 are driven at a considerably faster speed than the members 11 and 12 so that the cartridges will be rotated at least one complete revolution during the movement of the cartridges through an inspection zone. The inspection zone is defined by the path that the slits in discs 24 and 25 describe.

This apparatus has as its primary function the inspection of the end portion of a syringe cartridge for chips which occur in this portion.

As viewed in FIG. 4, the cartridges 28 have their outer ends 28a positioned in overlying relationship with respect to slits or apertures 25a, formed in the disc 25. As the cartridges are moved from left to right (see FIG. 1) by the chain members 11 and 12, and as the cartridges approach the inspection zone, they will move through this zone with a certain velocity. The discs 24, 25 and 26 are rotated and will move the slits, for example 25a, at the same velocity as the movement of the cartridge. In this manner slit 25a will underlie a cartridge end 28a while the cartridge is moving through the inspection zone.

The optical apparatus for inspecting the cartridges for chips takes the form of a source of radiation 36 which provides a plurality of vertically extending parallel rays of light. The light or radiation from source 36 will fall on the under surface of the disc 24 with a narrow beam of light passing vertically through the slit 24a. The beam of light that passes through slit 24a also will pass through slit 25a, inasmuch as both slits are in vertical alignment.

As previously stated, the cartridges to be inspected are always positioned in overlying relationship with respect to the slits 25a and thus the beam that passes through the slit 25a will pass through the cartridge to be inspected and if the cartridge is not defective or not chipped, the beam of light will continue in a vertical direction undisturbed by the presence of the cartridge in its path. This vertical beam will fall on the under surface of the disc 26, which, for example, may be blackened to absorb this light and to prevent stray reflections therefrom. Mounted above the disc 26 is a photo-sensitive pickup 37 which, for example, may be a "Silicone Solar Cell" 38, designated S–1–A and manufactured by Hoffmann Electronics Corporation Semi-Conductor Division, mounted within a casing 39 (see FIG. 6). The photo-detector 38 is light sensitive along substantially its entire under surface and upon receipt of the light beam thereon, provides an output voltage indicative of the presence of a chip. The cell 38 is connected by leads to a meter 61a.

With specific reference to FIGS. 5 and 6, the theory of operation will be explained. The source of radiation may be a light bulb 40 as shown in FIG. 5, or a source of either visible or invisible radiation which passes through the glass cartridges without substantial absorption. The casing 41 has a lens 42 mounted therein in spaced relationship with respect to the filament of the bulb 40. Light radiating from the bulb 40, upon passing through the lens 42, will immerge therefrom in the form of a plurality of parallel rays designated 43.

With reference to FIG. 6 a source of radiation generally designated 36 is shown positioned below the disc 24 with the parallel rays 43 striking the under-surface of the disc 24. For purposes of illustration, a single ray 43a is shown passing through the slit 24a formed in the disc 24 and also passing through the slit 25a formed in the disc 25 and extending through a cartridge 28 being inspected. It should be kept in mind that the discs 24 and 25 are rotating at a speed which is equal to the lateral movement of the cartridges to be inspected. In other words, the cartridges are also moving in synchronous relationship with respect to the movement of the slits 24a and 25a. In this manner the entire circumference of the cartridge, due to its rotation about its axis, will be scanned by successive rays 43a of light, and as shown in FIG. 6, when a chip 44 intercepts the ray 43a the ray will be deflected and pass through the slit 26a formed in the disc 26 and fall on the photo-detector 38. As previously stated if there is no chip in the cartridge 28, and by reason of the fact that the slit 26a is offset from the vertical plane passing through the slits 24a and 25a, no light will pass through the slit 26a.

The offset relationship of the slits 26a formed in the disc 26 with respect to slits 24a and 25a is best shown in FIG. 6. While this figure shows only a single slit in each of the discs it should be kept in mind that there are a plurality of slits in each disc with successive slits in each disc cooperating with successively conveyed cartridges 28. For example, as illustrated in FIG. 3, the discs have eight slits therein and thus for one revolution of the discs 24, 25 and 26, eight cartridges will be moved through the inspection zone and be scanned.

By improving a source of light having parallel vertical rays, a beam of light such as that shown at 43a will be passed through slits 24a and 25a from the moment that the slits are exposed to the rays 43. The rays 43 will be successively intercepted by the slits 24a and 25a as they move from left to right as viewed in FIG. 6. At the same time that the slits 24a and 25a are moving from left to right, the cartridge 28 is being moved from left to right at the same speed, however, it should be kept in mind that the cartridges 28 are also being rotated about their axis at a relatively higher rate of speed so that in actual practice a single cartridge, if it has a chip therein, will provide a pulsating output signal from the photo-detector 38, with the number of pulses being equal to the number of times that the chip is moved into the position shown in FIG. 6.

The theory upon which the beam of light is deflected by a chip is the well-known theory of refraction. When the beam of light passing through the cartridge falls on an irregular chip surface, the beam will be deflected with the degree of deflection being determined by the surface from which the beam immerges. The chip surface will, at some time during movement of the chip through the beam of light, cause the beam to deflect through the slit 26a. This particular deflection of the beam through the slit 26a will occur at least once during each revolution of the cartridge 28. Depending upon the rate at which the cartridges are rotated with respect to the time that they are being illuminated will determine the number of pulse outputs from the photo-detector 38. The photo-detector 38, as shown in FIG. 6, is mounted close to the disc 26 so that ambient light will not disturb the output thereof or cause an erroneous reading. The disc 26 will effectively mask the photo-detector as long as undamaged cartridges are being inspected.

Thus it can be seen that applicant has provided a novel method and apparatus for inspecting syringe cartridges or tubular pieces of transparent glass which is continuous in operation and does not require that the elements being tested be stopped from their continuous movement by the conveyor through the inspecting zone.

The foregoing description has been principally directed toward a method of and apparatus for checking syringe cartridges for chips in a continuous manner. The following description, with specific reference to FIGS. 7 to 10, relates to a method of and apparatus for checking syringe cartridges for chips which is not continuous, or intermittent, in its operation.

The inspection device disclosed in FIGS. 7 and 8 comprises a horizontally disposed circular disc 45 which is mounted on the upper end of a shaft 46. The shaft 46 extends vertically out of a gear box 47 which is mounted on a support 48, has an output shaft 50 which extends into the gear box 47, and will cause the output shaft to be rotated at a preselected speed. The upper surface of the disc 45 carries an annular ring 51 which may be formed of a rubber-like or resilient plastic material. The ring 51 is of an internal diameter which closely approximates the external diameter of the cartridge 28. The cartridges under examination will be placed in an upper position with their lower ends retained on the disc 45 by the ring 51 and thus upon rotation of the disc 45 the cartridges 28 will be rotated about the longitudinal axis. Adjacent the upper end 28a of the cartridge is positioned a source of illumination 52. This light source comprises a bulb 53 mounted within a cylindrical housing 54 with the housing having its forward end closed except for a narrow slit 55. A lens 56, mounted in the housing 54, provides a parallel beam of light falling on the end of the housing which has the slit 55 therein. The slit 55 permits passage only of a narrow beam therethrough.

It should be pointed out, and as is shown in FIG. 7, the direction of the narrow beam will diametrically bisect the cartridge 28. As illustrated in FIG. 9, the beam of light passing diametrically across the cartridge will be undisturbed if the cartridge has no surface defects or chips therein. Positioned on the opposite side of the cartridge and with its axis directed toward the surface of the cartridge on which the light will immerge, is a light sensitive pick-up unit 57. The unit 57 comprises a generally cylindrical housing 58 having a lens 59 mounted in the forward end thereof which will direct the light received from the source 52 onto the photocell 60. The photocell 60 is connected to a voltmeter 61 for providing an indication of the intensity of the light being received by the voltmeter.

As can be seen from viewing FIG. 7, the pick-up unit 57 is positioned with its longitudinal axis at an angle of approximately 10° to the direction of the beam of light passing through the cartridge. With the pick-up unit positioned at this angle, light passing through the cartridge which has no chips therein will not be sensed by the pick-up unit. However, light passing through a chipped cartridge as illustrated in FIG. 10 will be deflected by the presence of the chip and cause the light immerging from the chipped surface to be deflected in the direction of the pick-up unit 57. It should be pointed out that since the cartridge is being rotated, light passing out of a chipped surface, will in effect, sweep through a fairly wide angle in a horizontal plane. However, during this sweeping of the light beam, as it passes out of the chipped cartridge, it will, at some interval depending upon the rotational position of the cartridge, cause the light to be deflected in the direction of the pick-up unit.

Obviously when this light reaches the photocell 60 the voltmeter 61 will indicate that a chipped cartridge is being inspected. The apparatus shown in FIGS 7 and 8 may be a bench type test in that the cartridges may be placed on the disc 45 by hand or it would be possible to provide mechanism for intermittently placing the cartridges on the disc 45 for test purposes.

While the above description with respect to FIGS. 1–6 has been limited to the provision of an output voltage as an indication of the presence of chips in the syringe cartridges being inspected, it should be obvious that the output voltage may be utilized to actuate a reject mechanism or any means for segregating defective cartridges from good cartridges as they are being conveyed beyond the inspection zone.

Various modifications may be resorted to within the spirit and scope of the appended claim.

I claim:

Apparatus for indicating the presence of chips in syringe cartridges comprising means for conveying a plurality of cartridges along a straight line in a direction normal to the longitudinal axes of the cartridges, means for simultaneously rotating said cartridges about their longitudinal axes, a source of radiation, means for converting said source into parallel rays directed normally to the direction of movement of said cartridges, a vertical shaft extending parallel to the direction of illumination of the said parallel beams, a pair of spaced, apertured discs carried by said shaft, said apertures being in vertical alignment, a third apertured disc carried by said shaft spaced vertically above said pair of discs, the aperture in said third disc being circumferentially spaced out of alignment with the apertures in said first two discs, means for rotating said shaft and said discs in synchronism with the lateral movement of said cartridges, said conveying means moving said cartridges between said pair of discs and said third disc, and photo-electric means positioned above said third disc for sensing the presence or absence of light passing through said third apertured disc.

References Cited
UNITED STATES PATENTS

| 2,643,767 | 6/1953 | Baker | 88—14 X |
| 2,843,008 | 7/1958 | Moutet | 88—22.5 |
| 3,029,349 | 4/1962 | Schell | 88—14 X |
| 3,098,565 | 7/1963 | Fouse et al. | 88—14 X |

FOREIGN PATENTS

| 798,144 | 7/1958 | Great Britain. |

JEWELL H. PEDERSEN, *Primary Examiner.*

T. L. HUDSON, C. E. QUARTON, *Assistant Examiners.*